(12) United States Patent
Lillandt et al.

(10) Patent No.: US 10,329,359 B2
(45) Date of Patent: Jun. 25, 2019

(54) METHOD FOR PRODUCING MICROFIBRILLATED CELLULOSE AND MICROFIBRILLATED CELLULOSE

(71) Applicant: Kemira Oyj, Helsinki (FI)

(72) Inventors: Marcus Lillandt, Ingå (FI); Veli-Matti Vuorenpalo, Espoo (FI); Kari Vanhatalo, Espoo (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 15/522,475

(22) PCT Filed: Oct. 29, 2015

(86) PCT No.: PCT/FI2015/050748
§ 371 (c)(1),
(2) Date: Apr. 27, 2017

(87) PCT Pub. No.: WO2016/066904
PCT Pub. Date: May 6, 2016

(65) Prior Publication Data
US 2017/0313788 A1    Nov. 2, 2017

(30) Foreign Application Priority Data
Oct. 29, 2014  (FI) ...................... 20145947

(51) Int. Cl.
*C08B 15/02* (2006.01)
*C08L 1/02* (2006.01)
*C08B 15/08* (2006.01)

(52) U.S. Cl.
CPC .............. *C08B 15/02* (2013.01); *C08B 15/08* (2013.01); *C08L 1/02* (2013.01)

(58) Field of Classification Search
CPC .................. C08B 15/02; C08B 15/08
See application file for complete search history.

(56) References Cited

U.S. PATENT DOCUMENTS

| 2002/0026993 A1* | 3/2002 | Thornton ............... C08B 15/02 |
| | | 162/175 |
| 2005/0272836 A1 | 12/2005 | Yaginuma et al. |
| 2010/0065236 A1 | 3/2010 | Henriksson et al. |
| 2014/0155301 A1* | 6/2014 | Nelson ................... C08B 15/08 |
| | | 507/106 |

FOREIGN PATENT DOCUMENTS

| CN | 103132169 A | 6/2013 |
| JP | 2009261993 A | 11/2009 |
| JP | 2014118521 A | 6/2014 |
| WO | 2009126106 A1 | 10/2009 |
| WO | WO2011051882 | * 5/2011 |
| WO | 2012107642 A1 | 8/2012 |
| WO | 2014009517 A1 | 1/2014 |

OTHER PUBLICATIONS

Zeta Potential Time Dependence Reveals the Swelling Dynamics of Wood Cellulose Nanofibrils Kojiro Uetani and Hiroyuki Yano Langmuir, vol. 28, pp. 818-827 (Year: 2011).*
Lars Wågberg et al.: "The build-up of polyelectrolyte multilayers of microfibrillated cellulose and cationic polyelectrolytes", Langmuir, American Chemical Society, New York, NY; US, vol. 24, No. 3, Feb. 5, 2008, pp. 784-795, XP008143160. ISSN: 0743-7463.
Finnish Patent and Registration Office, Search Report, FI20145947, dated Aug. 5, 2015.
Chinese Patent Office, Chinese Patent Application No. 201580059381. 3, Official Action dated Mar. 26, 2018.

* cited by examiner

Primary Examiner — Douglas B Call
(74) Attorney, Agent, or Firm — Berggren LLP

(57) ABSTRACT

The invention relates to a method for producing microfibrillated cellulose, where a suspension comprising cellulose derivative in a liquid phase which comprises an organic solvent is provided. The suspension of cellulose derivative is mechanically treated and microfibrillated cellulose is obtained. At least a part of the liquid phase from the microfibrillated cellulose is separated and microfibrillated cellulose with a dry solids content of >30 weight-% is obtained.

8 Claims, 1 Drawing Sheet

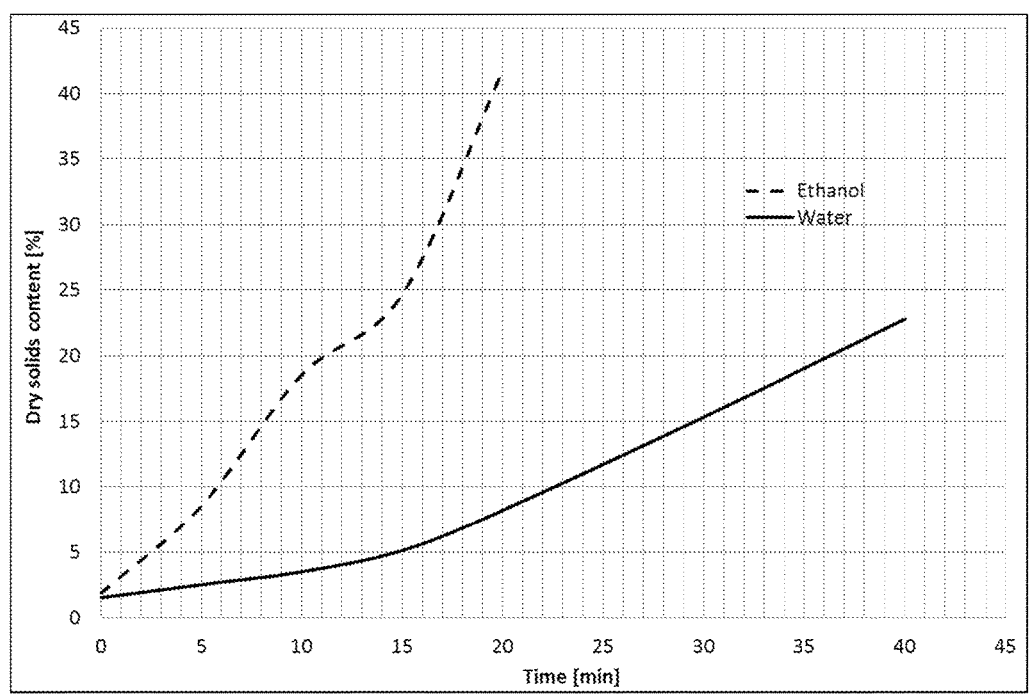

METHOD FOR PRODUCING MICROFIBRILLATED CELLULOSE AND MICROFIBRILLATED CELLULOSE

PRIORITY

This application is a U.S national application of PCT-application PCT/FI2015/050748 filed on Oct. 29, 2015 and claiming priority of Finnish national application number FI 20145947 filed on Oct. 29, 2014, the contents of all of which are incorporated herein by reference.

The present invention relates to a method for producing microfibrillated cellulose and microfibrillated cellulose according to the preambles of the enclosed claims Microfibrillated cellulose (MFC) is produced from various fibre sources comprising cellulosic structures, such as wood pulp, sugar beet, bagasse, hemp, flax, cotton, abaca, jute, kapok and silk floss. Microfibrillated cellulose comprises liberated semi-crystalline nanosized cellulose fibrils having high length to width ratio. A typical nanosized cellulose fibril has a width of 5-60 nm and a length in a range from tens of nanometers to several micrometers.

The interest for microfibrillated cellulose has increased during the last years, as the material has shown promising potential in a variety of applications, for example in food processing or for use in food products, pharmaceuticals or advanced materials, which comprise of metallic, ceramic, polymer, cementitious and wood materials and various compositions of these materials.

Conventionally microfibrillated cellulose is produced by using high-pressure homogenizers or fluidizers, in a process where the cell walls of cellulose containing fibres are delaminated and the nanosized cellulose fibrils are liberated. MFC is obtained as an aqueous suspension where the solids content is typically around 2%. Naturally, it would be economically feasible to increase this solids content, as it would decrease the transport and storage cost of the obtained MFC.

The problem, however, has been that the dry solids content of the microfibrillated cellulose suspension cannot be easily increase. Dewatering of MFC suspension is problematic due to gel structure. If MFC is dried, severe hornification occurs due to hydrogen bonding, which leads to unwanted and irreversible changes in the cellulose fibrils. This means that the dried MFC cannot be redispersed and does not obtain it original properties after drying.

It is especially problematic to produce microfibrillated cellulose with high solids content from cellulose derivatives, which are at least partly water soluble, such as carboxymethyl cellulose.

Consequently there exists a need for simple and effective method with which the solids content of the obtained microfibrillated cellulose can be increased, e.g. by simple dewatering. It would be advantageous if the microfibrillated cellulose would retain its original properties.

An object of this invention is to minimise or possibly even eliminate the disadvantages existing in the prior art.

An object of the present invention is to provide a method for producing microfibrillated cellulose which is easily dewatered and preferably also redispersed after dewatering.

Another object of the present invention is to provide a method for producing microfibrillated cellulose with high solids content.

These objects are attained with a method and an arrangement having the characteristics presented below in the characterising parts of the independent claims.

Typical method according to the present invention for producing microfibrillated cellulose comprises steps of
(a) providing a suspension comprising cellulose derivative in a liquid phase which comprises an organic solvent,
(b) mechanically treating the suspension comprising cellulose derivative and obtaining microfibrillated cellulose, and
(c) separating at least a part of the liquid phase from the microfibrillated cellulose and obtaining microfibrillated cellulose with a dry solids content of >30 weight-%.

Typical microfibrillated cellulose according to the present invention is produced by the method of the invention and has a dry solids content >30 weight-%.

Now it has been surprisingly found that when cellulose derivative is mechanically treated in presence of a liquid phase which comprises an organic solvent, the solids content of the obtained microfibrillated cellulose can be increased without losing the properties of the microfibrillated cellulose after redispersion. Thus the present invention provides a simple way to obtain redispersible microfibrillated cellulose with high solids content. This is advantageous in view of transport and storage of the obtained microfibrillated cellulose. It has been observed that unexpectedly good results are obtained when cellulose derivatives, which are at least partly water soluble, are used as starting material in the method.

In the present context the term "cellulose derivative" denotes chemically modified cellulose material, including cellulose material modified with acid. The cellulose material may originate from various natural fibre sources, which comprise cellulosic structures, such as wood pulp, sugar beet, bagasse, hemp, flax, cotton, abaca, jute, kapok and silk floss. The cellulose derivative may be at least partly water soluble.

Microfibrillated cellulose is used synonymously with terms "cellulose microfibrils", "microfibrillar cellulose", and "nanofibrillated cellulose". In the context of the present application the term "microfibrillated cellulose" is understood as liberated semi-crystalline cellulosic fibril structures or as liberated bundles of nanosized cellulose fibrils. Microfibrillated cellulose has a diameter of 2-60 nm, preferably 4-50 nm, more preferably 5-40 nm, and a length of several micrometers, preferably less than 500 μm, more preferably 2-200 μm, even more preferably 10-100 μm, most preferably 10-60 μm. Microfibrillated cellulose comprises often bundles of 10-50 microfibrils. Microfibrillated cellulose may have high degree of crystallinity and high degree of polymerization, for example the degree of polymerization DP, i.e. the number of monomeric units in a polymer, may be 100-3000. Further, microfibrillated cellulose may have as a suspension a high elastic modulus, for example in the range of $10\text{-}10^5$ Pa.

According to one embodiment of the invention the method produces redispersible microfibrillated cellulose. In the present context the term "redispersible microfibrillated cellulose" denotes microfibrillated cellulose, which reaches 90% of initial viscosity, when it is dispersed into water at ambient temperature and at initial solids content. Initial values refer to obtained values for the microfibrillated cellulose after mechanical treatment but before separation of the liquid phase.

According to one embodiment of the invention the cellulose derivative, which is used in the method, is anionic cellulose derivative, such as carboxymethyl cellulose (CMC) or TEMPO-oxidized cellulose. Preferably the cellulose derivative is carboxymethyl cellulose. In TEMPO-oxidation cellulose material is treated by 2,2,6,6-tetramethylpiperidine-1-oxyl radical mediated oxidation and successive mild disintegration in water. Preferably the anionic cellulose derivative, such as carboxymethyl cellulose (CMC), has degree of substitution DS<0.6, preferably <0.4, more preferably <0.2. The degree of substitution is typically above 0.01, preferably above 0.05. Use of anionic cellulose derivative, preferably CMC, with low degree of substitution provides good runnability and low energy consumption during the mechanical treatment in step (b).

According to another embodiment of the invention the cellulose derivative is microcrystalline cellulose, which has been produced through acid hydrolysis from above defined cellulose material. Microcrystalline cellulose may be not totally crystalline, i.e. it may contain some amorphous regions. The microcrystalline cellulose may have a degree of polymerization, DP, of <700, preferably <500, glucose units. It typically has a hemicellulose content in the range of 0-10 weight-%, preferably 0.5-7 weight-%, more preferably 1-5 weight-%, measured by conventional carbohydrate analysis methods, described in Determination of hemicelluloses and pectins in wood and pulp fibers by acid methanolysis and gas chromatography, Nordic pulp and paper research journal, 11, p. 216-219, 1996. Suitable acids for the hydrolysis of the cellulose starting material are both organic and inorganic acids, such as formic acid, acetic acid, sulphuric acid, hydrochloric acid, nitric acid, sodium bisulphate or sodium bisulphite, or any mixtures thereof. Sulphuric acid is preferred.

Step (a) of the method provides a suspension comprising cellulose derivative in a liquid phase which comprises an organic solvent. The cellulose derivative can be mixed with or suspended into the liquid phase by using suitable, conventionally known mixing or suspension methods. The cellulose derivative may be in dry form, or it may be in form of an aqueous starting suspension. The cellulose derivative is mixed with or suspended into liquid phase comprising organic solvent. If the cellulose derivative is in dry form a vigorous mixing is recommended in order to ensure an even dispersion of the cellulose derivative to the liquid phase of the suspension.

According to one embodiment of the invention the suspension comprising cellulose derivative is obtained in step (a) as follows: water in an aqueous starting suspension, which comprises cellulose derivative, is replaced and/or displaced by the organic solvent. First the water amount in the aqueous starting suspension may be reduced by mechanical water separation treatment, such as filtering, decanting or centrifuging. In this way a suspension comprising cellulose derivative and with solids content of at least 15 weight-%, preferably at least 25 weight-%, more preferably at least 30 weight-%, is obtained The water remaining in the suspension with high solids content is at least partially replaced by washing the suspension with an organic solvent, whereby the organic solvent replaces partly or wholly of water in the suspension. Typically the liquid phase of the suspension may comprise both water and organic solvent. After washing of the suspension with the organic solvent, the suspension is diluted with an organic solvent to solids content, which is suitable for mechanical treatment in step (b) of the method. Suitable solids content values are given later in this application. The organic solvent, which is used for washing, and the organic solvent, which is used for diluting the suspension, may be the same or different from each other.

Liquid phase of the suspension may preferably comprise water and at least one organic solvent. According to one embodiment of the invention the liquid phase comprises 50-100 weight-%, preferably 40-99 weight-%, more preferably 70-95 weight-%, of organic solvent or solvents and 0-50 weight-%, preferably 1-60 weight-%, preferably 5-30 weight-% of water. The organic solvent may be any suitable organic solvent, which is highly volatile, such as organic acid, ester, ether or alcohol. In general, alcohols are being preferred. According to one preferred embodiment of the invention the organic solvent is alcohol, such as ethanol, methanol, tert-butanol; acetone; or any mixture thereof. The liquid phase of the suspension may also comprise more than one organic solvent, for example a mixture of an organic acid and an alcohol.

In step (b) the suspension comprising cellulose derivative is mechanically treated, whereby microfibrillated cellulose is obtained. It should be noted that the suspension comprises a significant amount of organic solvent during the mechanical treatment of the cellulose derivative. The mechanical treatment may be grinding, extrusion, a high pressure homogenization or fluidization. The mechanical treatment may be carried out by using a refiner; grinder; homogenizer; colloider; friction grinder; fluidizer, such as microfluidizer, macrofluidizer or fluidizer-type homogenizer. According to one preferred embodiment in step (b) the suspension comprising cellulose derivative is mechanically treated by homogenization, e.g. high pressure homogenization, or fluidization. All conventional homogenizers and fluidizers available may be used, such as Gaulin homogenizer or microfluidizer. During homogenization or fluidization the mixture comprising natural cellulose fibers is subjected to high pressure of 500-2100 bar, preferably 500-1000 bar. For example, in homogenization the suspension comprising cellulose derivative is pumped at high pressure, as defined above, and fed through a spring-loaded valve assembly. The cellulose derivative in the suspension is subjected to a large pressure drop under high shearing forces. This leads to fibrillation of the cellulose derivative. Alternatively, in fluidization homogenization the suspension comprising cellulose derivative passes through Z-shaped channels under high pressure, as defined above. The channel diameter may be 200-400 µm. Shear rate, which is applied to the cellulose derivative in the suspension is high, and results in the formation of cellulose microfibrils. Irrespective of the procedure, i.e. homogenization or fluidization, which is used for producing the microfibrillated cellulose, the procedure may be repeated several passes until the desired degree of fibrillation is obtained.

The dry solids content of the suspension comprising cellulose derivative during the mechanical treatment, such as homogenization, is <15 weight-%, preferably <10 weight-%, more preferably <5 weight-%. According to one embodiment of the invention the dry solids content of the suspension comprising cellulose derivative during the mechanical treatment, such as homogenization or fluidization, is in the range of 0.1-30 weight-%, preferably 0.5-10 weight-%, more preferably 1-5 weight-%, even more preferably 1.5-3 weight-%.

In step (c) at least part of the liquid phase is separated from the microfibrillated cellulose, whereby microfibrillated cellulose with a dry solids content of >30 weight-% is obtained. The separation may be performed by using any suitable separation techniques, such as pressure filtering, vacuum filtering, evaporation or centrifuging, preferably by using a filtering technique, such as pressure filtering or vacuum filtering. According to one preferred embodiment of the invention in step (c) is obtained microfibrillated cellulose with a dry solids content of >30 weight-%, preferably >40 weight-%, more preferably >60 weight-%, even more preferably >80 weight-%. The solids content of the microfibrillated cellulose after step (c) may be 40-99 weight-%, preferably 60-95 weight-%, more preferably 80-90 weight-%.

According to one preferred embodiment of the present invention the liquid phase which is separated and which comprises organic solvent, is recirculated from step (c) back to step (a). In this manner, the consumption of the organic solvent in the process can be minimized.

The microfibrillated cellulose, which is obtained by using the method of the invention, is useful as a strength agent or barrier agent in pulp, paper and board applications or as a reinforcing agent for coating materials. It may also be used as emulsion agent, a suspension stabilizing agent or fluid suspension agent in oil drilling applications, food applications, cosmetic applications and/or pharmaceutical applications.

EXPERIMENTAL

Some embodiments of the invention are described more closely in the following non-limiting examples.

Example 1. Homogenisation of CMC to Produce MFC

Carboxymethyl cellulose, CMC, was made in laboratory according to Wagberg et al., Langmuir 2008, 24, 784-795. The degree of substitution of the produced CMC was determined to be 0.05 by a conductometric titration. After carboxymethylation, the obtained samples comprising cellulose derivative, i.e. CMC, were washed with water and diluted in a selected liquid phase, which was either pure water or a mixture of water and ethanol. These sample suspensions of cellulose derivative were mechanically treated by fluidizing in a Microfluidics fluidizer at pressures of 1500 bar. Experimental details are given in Table 1.

The fibrillation of the sample suspensions was characterised by light transmittance, which is known to correlate with the changes in degree of fibrillation as described for example in Kangas H., Lahtinen P., Sneck A., Saariaho A-M., Laitinen O., Hellén E.: Characterization of fibrillated celluloses. A short review and evaluation of characteristics with a combination of methods. Nordic Pulp and Paper Research Journal 29, p. 129-143, 2014. The light transmittance was measured with a Perkin Elmer Lambda 900 UV/VIS/NIR spectrophotometer from a homogenised sample diluted to 0.1 weight-%. The results are shown in Table 1. The transmittance wavelengths 400 nm, 600 nm, 800 nm and 1000 nm were compared. Higher transmittance is considered as a clear sign of fibrillation.

It is seen from the Results in Table 1 that microfibrillated cellulose, MFC, can be produced from carboxymethylated cellulose, i.e. a cellulose derivative, with chemically induced charges, when a mixture of ethanol and water is used as the solvent.

TABLE 1

Light transmittance data for CMC suspension samples, indicating the degree of fibrillation in the sample.

| Sample | Solvent in fluidizing | Number of fluidizing passes | Transmittance, % wavelength, nm | | |
|---|---|---|---|---|---|
| | | | 600 | 800 | 1000 |
| No 1 (reference) | water | 1 | 46.2 | 48.3 | 50.1 |
| No 2 (reference) | water | 2 | 57.5 | 61.5 | 64.4 |
| No 3 (reference) | water | 3 | 64.4 | 70.1 | 74.0 |
| No 4 | Water:ethanol; 50:50 | 1 | 43.4 | 47.8 | 51.6 |
| No 5 | Water:ethanol; 50:50 | 2 | 44.2 | 50.6 | 55.7 |
| No 6 | Water:ethanol; 50:50 | 3 | 45.3 | 52.9 | 59.2 |

Example 2. Homogenisation of MCC in Ethanol

Microcrystalline cellulose, MCC, which was made through acid hydrolysis as described in WO2011/154601 from kraft softwood pulp to achieve a degree of polymerization of 450, was used in Example 2.

50 g of MCC at a dry solids 40 weight-% was washed with 3000 g of ethanol and thereafter diluted with ethanol to consistency of 1.5%. This material was run through a Microfluidics fluidizer at pressure of 2000 bar. The fibrillation was determined by using light transmittance of the obtained microfibrillated cellulose, MFC, as described in Example 1.

The light transmittance results are given in Table 2.

The Example 2 shows that MFC can be produced from MCC, i.e. a cellulose derivative without chemically induced charges, when ethanol is used as the solvent.

TABLE 2

Light transmittance data for MCC/ethanol suspension samples, indicating the degree of fibrillation in the sample.

| Sample | Number of fluidizing passes | Transmittance, % wavelength, nm | | | |
|---|---|---|---|---|---|
| | | 400 | 600 | 800 | 1000 |
| No 1 | 1 | 8.98 | 13.2 | 17.0 | 20.6 |
| No 2 | 2 | 8.91 | 15.0 | 20.7 | 26.3 |
| No 3 | 3 | 10.4 | 18.6 | 26.0 | 32.1 |

Reference Example 3: Homogenisation of MCC in Water

Microcrystalline cellulose, MCC, was produced as described in Example 2. MCC was diluted with water to consistency of 1.5%, after which the MCC was homogenized in a GEA Niro Soavi NS3006H homogenizer to produce microfibrillated cellulose. The pressure in homogenisation was 1500 bar. The light transmittance was measured as described in Example 1 in order to measure for the degree of fibrillation. The results are given in Table 3.

The Example 3 shows that MFC can be produced from MCC when water is used as the solvent. When compared to the results obtained in Example 2, it is seen that the fibrillation results in pure water are inferior to those obtained in Example 2, where the suspension comprised ethanol.

TABLE 3

Light transmittance data for MCC/water suspension samples, indicating the degree of fibrillation in the sample.

| Sample | Number of homogenizing passes | Transmittance, % wavelength, nm | | | |
|---|---|---|---|---|---|
| | | 400 | 600 | 800 | 1000 |
| No 1 | 1 | 2.91 | 5.25 | 7.99 | 11.3 |
| No 2 | 2 | 3.52 | 6.98 | 10.9 | 15.1 |
| No 3 | 3 | 4.47 | 9.22 | 14.5 | 20.0 |

Example 4. Dewatering of MFC

Microcrystalline cellulose, MCC, which was prepared as described in Example 2, was used in tests.

In samples where water was used as solvent, MCC was diluted to consistency of 1.5%.

In samples where ethanol was used as solvent, 50 g of MCC at a dry solids 40 was washed with 3000 g of ethanol and thereafter diluted with ethanol to consistency of 1.5%. All the samples were prepared by running three times through a Microfluidics fluidizer at pressure of 1500 bar.

After fibrillation the MFC samples were dewatered in a pressure filter with 2.5 bar applied pressure. The sample size was 200 g of 1.5% suspension. The filter area was 115 cm$^2$.

The results are shown in FIG. 1. It is seen that the MFC sample comprising ethanol was much easier to dewater, i.e. a higher solids content was achieved much faster than then when the liquid phase of the suspension comprised pure water.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for producing microfibrillated cellulose, comprising steps
   (a) providing a suspension comprising a cellulose derivative in a liquid phase which comprises 50-100 weight-% of an organic solvent and 0-50 weight-% of water,
   (b) mechanically treating the suspension of the cellulose derivative by homogenization or fluidization and obtaining microfibrillated cellulose, and
   (c) separating at least a part of the liquid phase from the microfibrillated cellulose and obtaining microfibrillated cellulose with a dry solids content of >30 weight-%,
   wherein the cellulose derivative is selected from the group consisting of carboxymethyl cellulose, TEMPO-oxidized cellulose and microcrystalline cellulose, and the organic solvent is alcohol, acetone or any mixture thereof.

2. The method according to claim 1, wherein the carboxymethyl cellulose has degree of substitution DS<0.6.

3. The method according to claim 1, wherein the microcrystalline cellulose is produced through acid hydrolysis of cellulose material.

4. The method according to claim 1, wherein the alcohol is selected from the group consisting of ethanol, methanol, and tert-butanol.

5. The method according to claim 1, wherein in step (c) is obtained microfibrillated cellulose with a dry solids content of >40 weight-%.

6. The method according to claim 1, wherein in step (a) the suspension comprising cellulose derivative is obtained by replacing and/or displacing water in an aqueous suspension comprising cellulose derivative by the organic solvent.

7. The method according to claim 1, wherein the dry solids content of the suspension comprising cellulose derivative during the mechanical treatment, is <15 weight %.

8. The method according to claim 1, wherein the separated liquid phase comprising organic solvent is recirculated from step (c) back to step (a).

* * * * *